United States Patent [19]

Koneval et al.

[11] Patent Number: 4,825,710
[45] Date of Patent: May 2, 1989

[54] ENCLOSURE FOR ELECTRICAL SENSOR

[75] Inventors: Donald J. Koneval, Brookfield; Harold J. Pollnow, Dousman; Richard J. Molus, Sr., Greenfield, all of Wis.

[73] Assignee: Allen-Bradley Company, Inc., Milwaukee, Wis.

[21] Appl. No.: 104,345

[22] Filed: Oct. 2, 1987

[51] Int. Cl.⁴ ............ G01D 11/00; G01D 11/24; G01D 19/14
[52] U.S. Cl. ........................ 73/866.5; 73/756
[58] Field of Search .......... 73/866.5, 756; 374/208, 374/147, 150

[56] References Cited

U.S. PATENT DOCUMENTS

| | | | |
|---|---|---|---|
| 1,764,987 | 6/1930 | Schwartz | 374/208 X |
| 3,009,217 | 11/1961 | Weiner | 374/208 X |
| 3,587,322 | 6/1971 | Lubdell et al. | 73/756 |
| 4,240,409 | 12/1980 | Robinson et al. | 417/384 X |
| 4,327,586 | 5/1982 | Goddard | 73/866.5 |
| 4,434,668 | 3/1984 | Shiroda et al. | 73/866.5 X |
| 4,454,370 | 6/1984 | Voznick | 374/208 X |
| 4,513,623 | 4/1985 | Kurtz et al. | 73/756 X |
| 4,637,737 | 1/1987 | Ricchio | 374/150 X |
| 4,638,828 | 1/1987 | Barrineau, Sr. et al. | 251/11 X |

FOREIGN PATENT DOCUMENTS 89725  5/1985  Japan .................. 73/756

Primary Examiner—Tom Noland
Attorney, Agent, or Firm—Quarles & Brady

[57] ABSTRACT

An enclosure for a transducer includes a cylindrical housing and an end cap covering one end of the housing. A coupling ring engages an annular projection on the one end of the housing and a threaded portion of the end cap to hold the two elements in an abutting relationship. The housing has a threaded aperture therethrough. One of a series of different types of plumbing fittings, each having a common threaded projection, has the threaded projection received in the aperture of the housing. The end cap has a threaded aperture therethrough with one of a series of different types of electrical couplings received therein. Each of the couplings of the series has a common threaded projection which is adapted to mate with the end cap aperture. A set of stops is provided to prevent the end cap and the housing from rotating more than 360 degrees with respect to each other.

7 Claims, 2 Drawing Sheets

ENCLOSURE FOR ELECTRICAL SENSOR

The present invention relates to enclosures for transducers which sense a given parameter, such as pressure, and produce an electrical signal which indicates the magnitude of the sensed parameter.

BACKGROUND OF THE INVENTION

In industrial control systems for controlling manufacturing processes, various parameters of the processes are sensed and action is taken based on the magnitude of the parameter. For example, when the pressure in a vessel reaches a given level, a valve may have to be opened to release the pressure. Such pressure sensors are available for use over different ranges of pressures.

The currently available sensors have enclosures which are adapted to receive one of several different types of standard plumbing fittings, such as pipe threads or compression fittings, as well as different sizes of each type. Similarly, the sensor enclosures are adapted to receive one of several different types of electrical fittings so that electrical connections may be made to the device. These electrical fittings include compression bushings for cables, conduit adaptors and different electrical connectors.

These sensor variables: pressure range, plumbing fitting and electrical fittings have heretofore required manufacturers to make and stock a wide variety of sensors having different combinations of these variables. Similarly, the end user had to stock a variety of sensors to replace ones that failed.

When the plumbing and electrical connections are made to conventional sensors, wrenches are often used to insure a tight fit. However, the use of wrenches can result in the connection being over torqued causing damage to the sensor. It is therefore desireable to provide as many connections as possible which can be made by hand and to provide a safeguard against sensor damage due to over torquing.

SUMMARY OF THE INVENTION

A sensor according to the present invention is mounted in a universal housing which can accommodate a variety of different plumbing and electrical fittings. One end of the cylindrical housing has a threaded aperture therethrough for receiving a plumbing fitting of the system which carries the pressurized fluid to be sensed. A parameter transducer, such as for sensing the fluid's pressure, is within the housing. The other end of the housing is cylindrically shaped. An end cap is adapted to mate with the other end of the housing. A threaded attachment means is provided to releasably hold the end cap on the housing while permitting the end cap to be removed. A means is provided for restricting the rotation of the cap with respect to the housing to not more than 360 degrees in the mated state.

The end cap includes a threaded aperture therethrough for receiving an electrical coupling. The threaded aperture permits any one of several standard types of electrical couplings to mate with the sensor depending upon the kind of electrical connection that is desired.

An object of the present invention is to provide a universal transducer enclosure to which a variety of electrical and plumbing fittings can be connected. This is accomplished through the use of a threaded coupling that is common to the different types of fittings. This departs from the previous practice of having a separate type of housing for each combination of electrical and plumbing fitting types.

Another object is to incorporate a means for making electrical connection to the sensor without having to remove the housing from the plumbing fitting.

A further object is to prevent the electrical wires from being unduly twisted when assembling and disassembling the enclosure.

Yet another object is to provide a safeguard against damage to the enclosure and its transducer due to over torquing during the assembly of the enclosure.

DETAILED DESCRIPTION OF THE INVENTION

Figure 1:
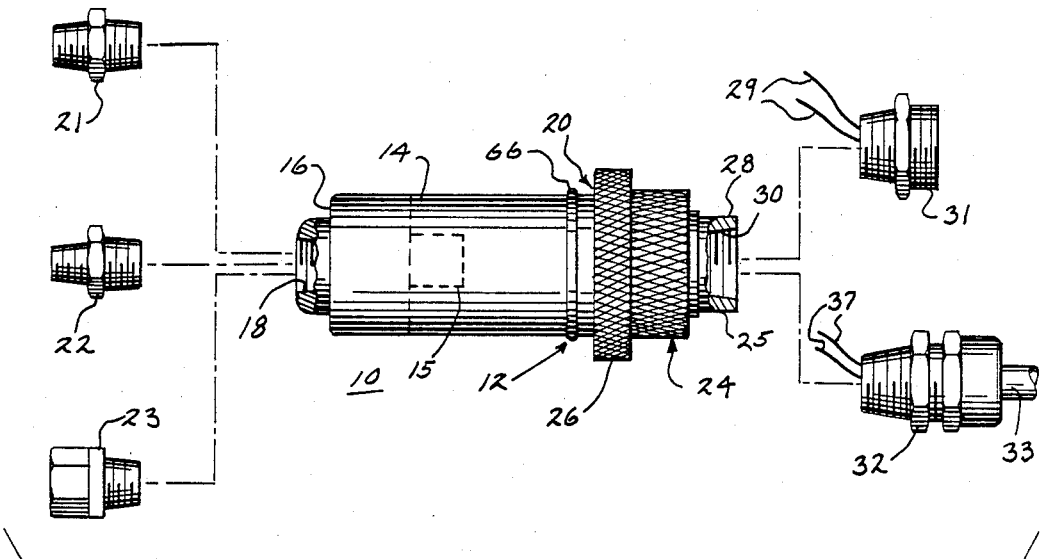
FIG. 1 is an exploded view of the sensor enclosure according to the present invention showing a plurality of couplings which can be used with the enclosure.

With initial reference to FIG. 1, a pressure sensor 10 includes an enclosure 12. The enclosure includes a cylindrical tubular shaped sensor housing 14 which is typically fabricated of metal. A closed first end 16 of the housing 14 includes a threaded aperture 18 for receiving one of several plumbing fittings 21-23. The threads of the aperture 18 are conventional national pipe threads. This enables one of several different sized male-to male plumbing fittings 21 and 22 to be inserted into the one end 16 of the housing to connect it to different sized pipe. Alternatively, a compression type plumbing fitting 23 can be inserted into the aperture 18. This common threaded aperture 18 enables a single sensor enclosure 12 to be coupled to a variety of different plumbing fittings.

Within the housing 14 is a conventional parameter transducer 15 indicated in phantom. For example, the transducer 15 may respond to the pressure of a fluid communicated into the sensor housing 14 via one of the fittings 21-23 by producing an electrical signal indicating the magnitude of the pressure. Although the present invention is described in terms of a pressure sensing transducer, the invention can be used with other types of transducers, such as, ones for measuring the temperature of the fluid. As will be described in detail hereinafter, the transducer's electrical signal is made available at a terminal block positioned at the second end 20 of the housing 14 opposite the first end 16.

The enclosure 12 also includes a cylindrical hollow end cap 24 held onto the second end 20 of the housing 14 by a coupling ring 26. The end cap 24 and coupling ring 26 are formed of metal or plastic and while not required they are typically formed of the same material. The distal end 28 of the end cap 24 is closed by a smaller diameter coupling portion 25 with a threaded aperture 30 extending therethrough. The interior surface of the aperture 30 contains ⅜-14 national pipe threads for receiving any of several electrical couplings. However, end caps with metric threads can be provided for use in countries having metric thread standards. The threaded aperture enables a conventional electrical conduit adaptor to be inserted directly into the end cap 24. Alternatively, a water tight cable bushing 32 may be provided to couple an electrical cable 33 with its individual wires 37 to the enclosure 12. A male or female electrical connector 31 with wires 29 may also be inserted directly into the aperture 30 in the end cap 24. By providing a standard threaded aperture 30 on the end cap 24, any one of several different types of electrical fittings may be used with the same sensor enclosure 12.

As the end cap 24 and its mating coupling ring 26 are separate units from the sensor enclosures 12, any one of several different types of end caps may be used with the same basic style of enclosure. For example, the end cap 24 can be packaged separately from the sensor enclosure, allowing the end user to select a metal or plastic end cap, the type of threaded aperture 30, as well as the type of electrical coupling 31-32 to use for the particular sensor application. Alternatively, the end cap could be packaged with one of the different types 31-32 of electrical couplings already attached to it. The supplier of the devices needs only to stock a set of sensor enclosures with transducers of the different pressure ranges and a set of the different types of end caps and couplings. The end user then selects one item from each set to configure the entire sensor 10.

Figure 2A:
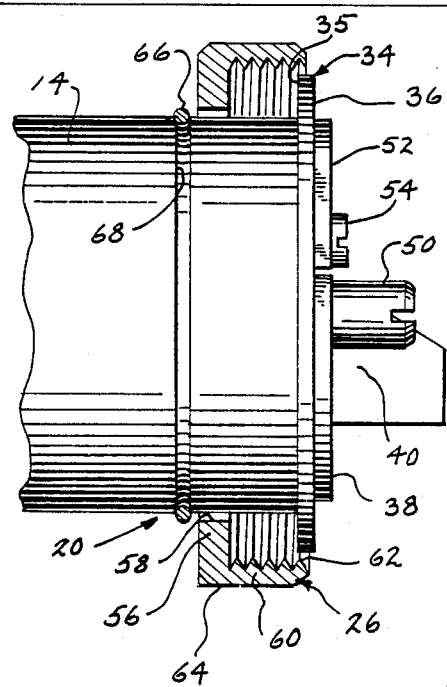
FIGS. 2A and B are two views of the electrical connection end of the sensor housing of the enclosure.
Figure 2B:
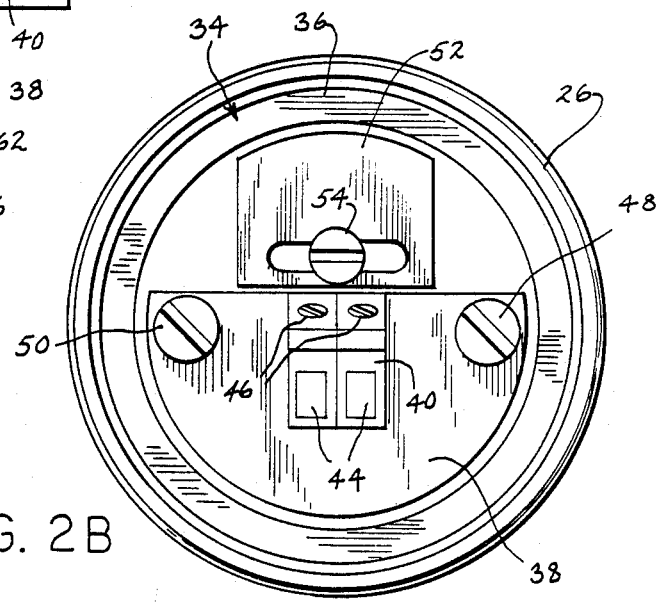

The details of the second end 20 of the housing 14 are shown in FIGS. 2A and B. A disk-like sealing member 34 extends across the second end of the tubular housing 14, projecting axially from the outer diameter of the housing 14. The sealing member 34 has an inner and an outer surface 35 and 36, respectively. A printed circuit board 38 is mounted on the outer surface 36 to provide an electrical interconnection between the transducer within the housing 14 and external wires (e.g. 29 and 37, FIG. 1). Mounted on the printed circuit board 38 is a terminal block 40 for connecting a pair of wires to the sensor. The terminal block 40 is of a conventional design and includes two apertures 44 into which the wires may be positioned and clamped by two screws 46. The number of connections provided by the terminal block 40 will vary depending upon the type of transducer. The printed circuit board 38 and its terminal block 40 are mounted against the outer surface 36 by two bolts 48 and 50 which thread into apertures (not shown) in the sealing member 34. Each of the bolts 48 and 50 has an elongated head, the purpose of which will become apparent in the following discussion. A cover plate 52 is also mounted against the outer surface 36 by a bolt 54 and extends over several openings through the sealing member 34 which provide access to internal adjustments for the transducer 15 within the housing 14.

The coupling ring 26 formed of metal or plastic extends around the cylindrical body of the housing 14. The coupling ring 26 has a collar member extending axially inward from one edge of the ring. The collar member 56 has a curved surface 58 with a diameter which is slightly larger than the outer diameter of the housing 14. The main portion 60 of the coupling ring 26 has an internal surface 62 with threads cut therein. The outer surface 64 of the coupling ring may be knurled to facilitate gripping by hand. As the diameter of the curved surface 58 of the collar member 56 is slightly larger than the outer diameter of the housing 14, the coupling ring 26 may slide longitudinally along the housing.

An O-Ring 66 is positioned in an annular groove 68 extending around the outer surface of the housing 14 and spaced from the sealing member 34. The outer diameter of the O-Ring 66 is slightly larger than the inner diameter of the coupling ring collar 56. This restricts the longitudinal movement of the coupling ring 26 along the housing 14 to the section between the O-Ring 66 and the sealing member 34. The O-Ring is sufficiently resilient to allow the coupling ring 26 to be forced over it toward the first end 16 of the housing 14. However, unless considerable force is exerted on the coupling ring 26, it will be held between the O-Ring 66 and the sealing member 34. The purpose of the O-Ring 66 is to allow the selected metal or plastic coupling ring 26 to be positioned around the sensor housing 12 and after which to prevent the coupling ring 26 from sliding longitudinally along the housing 14 and over the plumbing fitting 21, 22 or 23. This retains the coupling ring around the housing during assembly and disassembly of the sensor 10.

Figure 3:
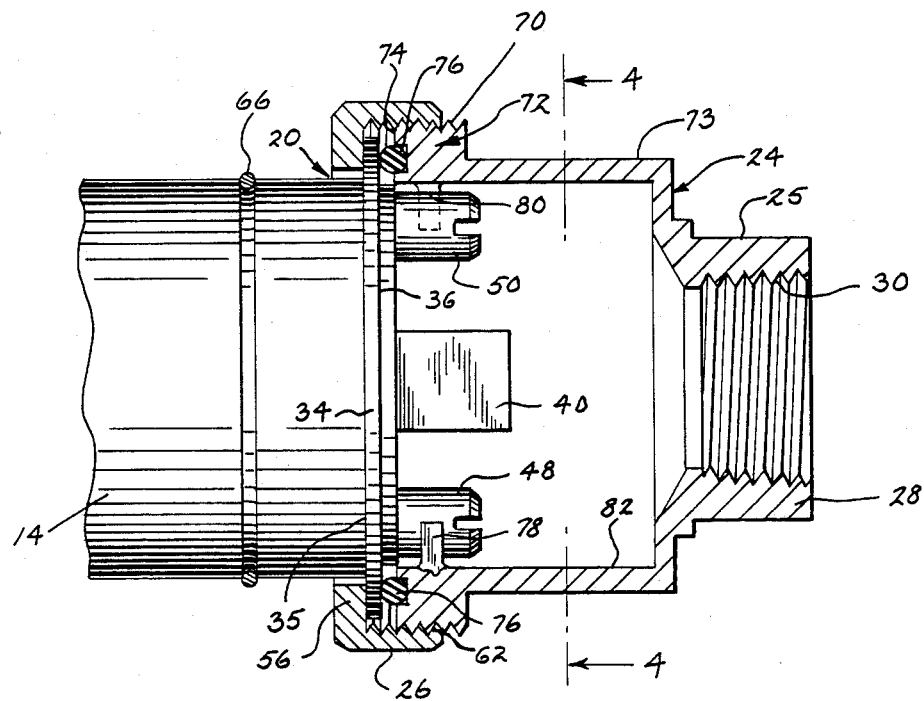
FIG. 3 is a partial cross sectional view of the end cap assembled on the housing.

FIG. 3 shows a cross section of the end cap 24 and coupling ring 26 assembled on the housing 14. The end cap may be formed from either metal or plastic. The end cap 24 has external threads 70 on its outer circumferential surface near the proximal end 72 of the end cap. The edge surface 74 of the cap contains an annular groove in which a second O-Ring 76 is positioned. The outer surface 73 of the cap 24 is knurled to facilitate gripping the cap by hand as is required during the assembly of the cap onto the sensor housing 14.

When the cap 24 is assembled onto the second end 20 of the housing 14 the end surface 74 abuts the outer surface 36 of the annular sealing member 34, the second O-Ring 76 is compressed between the two surfaces providing a liquid tight seal. To accomplish this seal the coupling ring 26 is moved longitudinally toward the second end 20 of the housing 14 and the threads on the internal surface 62 of the ring are threaded onto the external threads 70 of the end cap 24. As the coupling ring 26 is tightened onto the end cap 24, the collar 56 of the coupling ring contacts the inner surface 35 of the sealing member 34 pulling the end cap against the housing 14.

As an alternative design, the coupling ring 26 could extend around the end cap 24 and engage threads on the outer edge of the sealing member 34. In this variation, the thickness of the sealing member 34 would have to be increased to allow threads to be cut in its edge.

The present structure allows the orientation of the end cap 24 in the fastened state to be varied with respect to the enclosure 12 so that the electrical connection can be facilitated. In assembling the sensor 10, the enclosure 12 can be connected to the plumbing system first. Then the electrical conductors can be fed through the end cap 24 and connected to the terminal block 40. The end cap 24 is then fastened to the enclosure 12 by the coupling ring 26. This fastening is accomplished without significant rotation of the end cap and allows the end cap 24 to assume a variety of rotational orientations with respect to the enclosure 12. The rotational orientation is often dictated by the direction that the electrical cable must take from the sensor, especially when a right angle electrical coupling is used.

Figure 4:
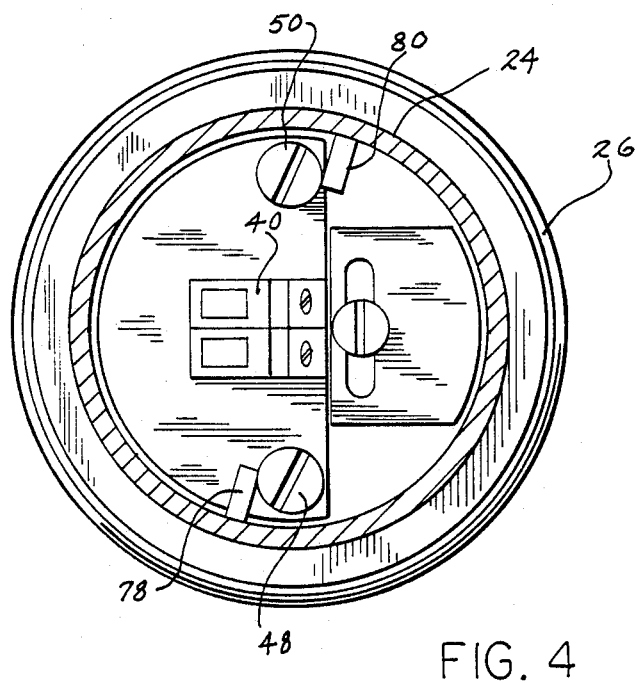
FIG. 4 is a different cross sectional view of the end cap assembled on the housing taken along line 4—4 of FIG. 3.

Two diametrically opposed tabs 78 and 80 extend inwardly from the inner surface 82 of the end cap 24. When the cap is rotated into the position shown in FIGS. 3 and 4, the two tabs 78 and 80 abut the two bolts 48 and 50. Each set of a tab and a bolt form a pair of stops which limit the amount of rotation between the housing 14 and the end cap 24. As the coupling ring 26 and the end cap 24 are screwed together, the tabs permit the end cap 24 to be rotated with respect to the housing 14 slightly less than 180 degrees before striking one of the bolts. For example, with reference to FIG. 4, the end cap may be rotated in the clockwise direction slightly less than a 180 degrees until the first tab 78 comes into contact with the second bolt 50 and the second tab 80 contacts the first bolt 48.

The purpose of the tabs is to limit the rotational movement of the cap with respect to the housing 14. Therefore, when electrical wires are fed through opening 30 and attached to the terminal block 40, the rotation of the cap during assembly and disassembly will not twist the wires a significant amount so as to damage the conductors within the wires. The design of the tabs may vary and different structures can be used to provide stops which limit the rotation of the end cap 24.

Alternatively, a single tab either 78 or 80 could be employed and one of the terminal block bolts 48 or 50 could have a shorter head than is shown in the preferred embodiment. In this case, the enclosure 12 for the sensor would provide a mechanism which would restrict the rotation of the cap with respect to the sensor housing 14 by an amount slightly less than 360 degrees. While this alternative would not provide the same degree of restriction as the preferred embodiment illustrated herein, in many instances it would provide an adequate mechanism for preventing damage to the electrical conductors due to twisting associated with the rotation of the end cap.

The size of the tabs 78 and 80 is chosen so that they will shear off or bend under an excessive torque (rotational force) being applied between the end cap 24 and the housing 14. The torque at which the tabs will yield is less than the torque required to shear off the heads of the bolts 48 and 50. If one or both of the bolts was to shear off, the entire sensor housing 14 might have to be replaced. This would necessitate removal of the housing from the plumbing fitting 21, 22 or 23 which could require draining and refilling the fluid in the plumbing system. By making the end cap 24 expendable when excessive torque is applied, only it needs to be replaced and the housing 14 can remain coupled to the plumbing system.

We claim:

1. A sensor comprising:
   a housing having a cylindrical end portion that includes a sealing surface and said housing has a threaded aperture therethrough;
   a transducer located within said housing;
   a cap having a cylindrical portion abutting the sealing surface and having external threads on its cylindrical portion;
   a coupling ring engaging the end portion of said housing and having threads which engage the external threads of the cap; and
   a plumbing fitting having a threaded tubular portion that is received in the aperture of said housing, the fitting being selected from a plurality a different types of plumbing fittings all of which have a common threaded tubular portion which mates with the threaded aperture of said housing.

2. The sensor as recited in claim 1 wherein said cap includes a threaded aperture extending therethrough; and further comprising an electrical coupling having a threaded tubular portion that is received in the aperture of said cap, the coupling being selected from a plurality of different types of electrical couplings all of which have a common threaded tubular portion which mates with the threaded aperture of said cap.

3. The sensor as recited in claim 1 further comprising:
   a first stop on the end portion of said housing; and
   a second stop on the cap positioned to engage the first stop upon said housing and said cap being rotated with respect to each other.

4. The sensor as recited in claim 1 wherein said housing further includes means for restricting the movement of said coupling ring along said housing.

5. A sensor comprising:
   a housing having a cylindrical first end, and a second end having an aperture extending therethrough;
   a transducer within said housing;
   a cap having a cylindrical portion abutting the first end of the housing and having external threads on its cylindrical portion, said cap also having a threaded aperture extending therethrough;
   a coupling ring engaging the first end of said housing and having threads which engage the external threads of the cap;
   a pair of stops, one of which being on the housing and the other one on said end cap, said stops engaging each other when said cap and said housing are rotated with respect to each other;
   an electrical coupling having a threaded tubular portion that is received in the aperture of said cap; and
   a plumbing fitting having a threaded tubular portion that is received in the aperture of said housing.

6. The sensor as recited in claim 5 further comprising means for sealing the abutment between the housing and the end cap.

7. The sensor as recited in claim 5 further comprising an O-Ring extending around said housing spaced from the first end.

* * * * *